US007622226B2

(12) United States Patent
Takahashi

(10) Patent No.: US 7,622,226 B2
(45) Date of Patent: Nov. 24, 2009

(54) SECONDARY BATTERY HAVING A TERMINAL FOR SURFACE MOUNTING

(75) Inventor: Tadayoshi Takahashi, Osaka (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 11/632,504

(22) PCT Filed: Oct. 24, 2005

(86) PCT No.: PCT/JP2005/019494

§ 371 (c)(1), (2), (4) Date: Jan. 16, 2007

(87) PCT Pub. No.: WO2006/049027

PCT Pub. Date: May 11, 2006

(65) Prior Publication Data

US 2008/0076021 A1 Mar. 27, 2008

(30) Foreign Application Priority Data

Nov. 4, 2004 (JP) ............................. 2004-320205

(51) Int. Cl.
*H01M 10/40* (2006.01)
*H01M 4/40* (2006.01)
*H01M 2/30* (2006.01)

(52) U.S. Cl. ....................................... 429/326; 429/340

(58) Field of Classification Search ................. 429/326, 429/340, 345
See application file for complete search history.

(56) References Cited

U.S. PATENT DOCUMENTS 5,580,684 A * 12/1996 Yokoyama et al. .......... 429/324
6,274,277 B1 8/2001 Mori et al.
6,482,549 B2 11/2002 Yoshimura et al.
2003/0162100 A1 8/2003 Takahashi et al.

FOREIGN PATENT DOCUMENTS

| | | |
|---|---|---|
| JP | 59-096665 | 6/1984 |
| JP | 60-154478 | 8/1985 |
| JP | 2000-040525 | 2/2000 |
| JP | 2001-243981 | 9/2001 |
| JP | 2003-017120 | 1/2003 |
| JP | 2003-045485 | 2/2003 |
| JP | 2003-249263 | 9/2003 |
| JP | 2005-071683 | 3/2005 |

* cited by examiner

*Primary Examiner*—Gregg Cantelmo
(74) *Attorney, Agent, or Firm*—McDermott Will & Emery LLP

(57) ABSTRACT

Disclosed is a secondary battery having a terminal for surface mounting which includes a power generating element and a battery case for housing the power generating element. The power generating element includes a positive electrode, a negative electrode, a separator interposed between the positive electrode and the negative electrode, and an organic electrolyte. The battery case includes a positive electrode can electrically connected with the positive electrode and a negative electrode can electrically connected with the negative electrode, and a gasket interposed between the positive electrode can and the negative electrode can. The organic electrolyte contains an organic solvent in which a solute is dissolved, and the organic solvent contains sulfolane and 1,2-dimethoxyethane. Amounts of the sulfolane and the 1,2-dimethoxyethane are 80 to 95 volume % and 5 to 20 volume %, respectively, with respect to the total amount of the sulfolane and the 1,2-dimethoxyethane. The organic electrolyte contains $LiN(CF_3SO_2)_2$ in 0.9 to 1.3 mol/L.

4 Claims, 1 Drawing Sheet

10
2 5 6 3 8
1
7 4

F I G. 1
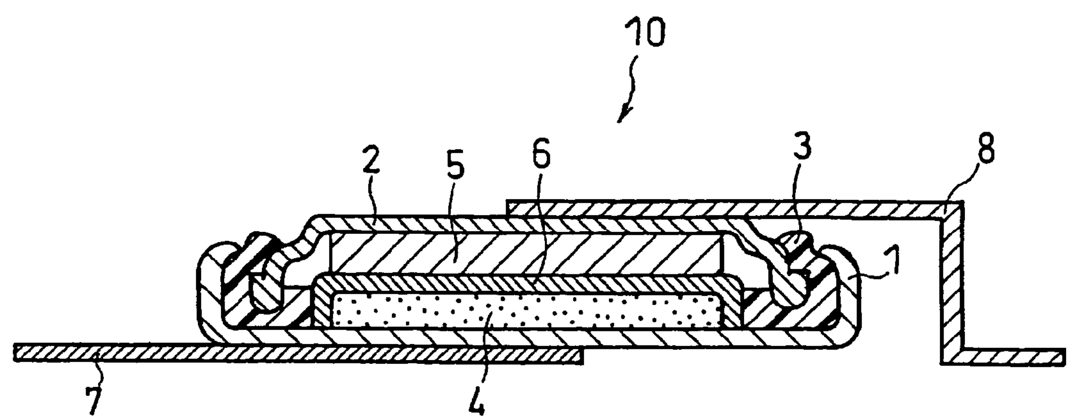

SECONDARY BATTERY HAVING A TERMINAL FOR SURFACE MOUNTING

RELATED APPLICATIONS

This application is a national phase of PCT/JP2005/019494 filed on Oct. 24, 2005, which claims priority from Japanese Application No. 2004-320205 filed Nov. 4, 2004, the disclosures of which Applications are incorporated by reference herein. The benefit of the filing and priority dates of the International and Japanese Applications is respectfully requested.

TECHNICAL FIELD

The present invention relates to a secondary battery having a terminal for surface mounting, which has a high capacity and is excellent in resistance to leakage and in charge/discharge cycle characteristics.

BACKGROUND ART

Small size secondary batteries have been used as power sources for memory backup of portable equipment such as cellular phones in recent years. For example, a coin shape lithium secondary battery comprising a positive electrode containing a lithium manganese composite oxide and a negative electrode containing a lithium aluminum alloy and having a voltage of approximately 3 V has been used. Further, a coin shape lithium secondary battery comprising a positive electrode containing niobium pentoxide and a negative electrode containing a lithium aluminum alloy and having a voltage of approximately 2.5 V has been used.

A small size secondary battery is usually mounted on a circuit board. The conventional mounting process of a secondary battery is carried out by, for example, soldering manually. Alternatively, the small size secondary battery is inserted in a battery holder incorporated in a circuit board using a robot or manually. Recently, however, automatic mounting by means of a reflow method has been examined. As one of the examples of the reflow method, there is a method to carry out soldering by supplying solder between a circuit board and a terminal of a part and then allowing them to pass through a high temperature atmosphere. The soldering ensures an electrical contact between a circuit on the circuit board and the terminal of the part. In the case where lead-containing solder is used, a maximum temperature of the high temperature atmosphere is in the range approximately from 220° C. to 240° C. However, in the case where lead-free solder is used, a maximum temperature of the high temperature atmosphere is predictably in the range approximately from 250° C. to 260° C.

It is necessary to provide a heat resistance to a component material of a battery in order to carry out automatic mounting by means of a reflow method. For example, a lithium secondary battery contains an organic electrolyte, and the organic electrolyte comprises an organic solvent and a solute dissolved therein. It is therefore necessary to provide a heat resistance to the organic solvent. In view of this, Patent Document 1 proposes that sulfolane having a boiling point of not less than 260° C. be used.

In the case where sulfolane is used singly, stability in high temperatures of the secondary battery is improved, whereas charge/discharge cycle characteristics become insufficient due to decreased electrical conductivity of the electrolyte. In view of this, Patent Document 2 proposes that a mixture solvent comprising sulfolane and 1,2-dimethoxyethane be used in order to improve the charge/discharge characteristics. Patent Document 2 teaches that an amount of the sulfolane is preferably 3 to 50 volume % with respect to the total amount of the organic solvent. Moreover, it teaches that a volume ratio of the 1,2-dimethoxyethane of not less than 50% causes the viscosity of the organic electrolyte to decrease and the electrical conductivity thereof to increase, whereby the charge/discharge cycle characteristics improve.

Patent Document 1: Japanese Laid-Open Patent Publication No. 2000-40525

Patent Document 2: Japanese Laid-Open Patent Publication No. 2003-17120

DISCLOSURE OF THE INVENTION

Problem to be Solved by the Invention

As mentioned above, it has been proposed that an organic electrolyte in which not less than 50 volume % of an organic solvent is 1,2-dimethoxyethane be used. In the case where the organic electrolyte containing 1,2-dimethoxyethane in high concentration is used, however, a larger amount of the organic electrolyte is required for obtaining stable battery characteristics. When the organic electrolyte containing 1,2-dimethoxyethane in high concentration is charged into a battery in an amount, for example, equivalent to the standard amount of an organic electrolyte using sulfolane singly, the internal resistance widely fluctuates and the discharge characteristics degrade. This is because an amount of the organic electrolyte to be included in the separator decreases. In the case where an amount of the 1,2-dimethoxyethane contained in the organic solvent is not less than 50 volume %, the viscosity of the organic electrolyte decreases to approximately one tenth of that in the case where sulfolane is used singly. As a result, an amount of the organic solvent retained in the porous positive electrode increases to approximately 1.5 times of that in the case where sulfolane is used singly. The separator consequently cannot retain a necessary amount of the organic electrolyte, causing resistance components of the separator to increase.

In the case where the low viscous organic electrolyte containing 1,2-dimethoxyethane in high concentration is used, a liquid amount of 1.5 to 2 times of that in the case where sulfolane is used singly is required for maintaining stable characteristics of a battery. With an amount smaller than this, it is impossible to obtain charge/discharge characteristics more excellent than that in the case where sulfolane is used singly.

However, when the amount of the organic electrolyte to be charged into the battery case is increased, the possibility of causing leakage is also increased. As the causes of the leakage, the following two are considered in addition to degradation in the sealing member such as a gasket. One is elevation of the internal pressure of the battery, which is caused by generation of gas through the reaction of the electrode active material and the organic electrolyte. Leakage of the organic electrolyte to the outside of the battery causes a reduction in the internal pressure of the battery. The other is expansion of the organic electrolyte. For example, when the battery is exposed to high temperatures, the organic electrolyte expands (the specific gravity decreases). In the case where nearly 100% of the inner space of the battery is occupied by a power generating element, the internal pressure of the battery is abruptly raised, eventually resulting in leakage.

The temperature of a battery having a terminal for surface mounting rises from a room temperature to approximately 260° C. during reflow. Because of this, different from the conventional battery used in a temperature environment of approximately 85° C. at most, consideration must be taken particularly with regard to the expansion of the organic electrolyte.

Further, the battery case of the battery having a terminal for surface mounting is sealed by a gasket. Polypropylene is used for a gasket of the conventional battery. In contrast, an engineering plastic (for example, polyphenylene sulfide (PPS) and polyether ether ketone (PEEK)) is used for the gasket of the battery having a terminal for surface mounting. The engineering plastic is not as excellent as polypropylene in sealing characteristics. An organic electrolyte added with a low viscous organic solvent therefore causes leakage easily. In other words, in the battery having a terminal for surface mounting added with the low viscous organic solvent, resistance to leakage decreases when the battery is exposed to heat shock (especially when the battery is mounted by a reflow method).

Thus, it has been desired to provide a secondary battery having a terminal for surface mounting, which has a high capacity, is capable of maintaining the stable battery characteristics even when the amount of the organic electrolyte contained therein is small, and is excellent in resistance to leakage. Furthermore, it has been desired to provide a secondary battery having a terminal for surface mounting, which has more excellent charge/discharge cycle characteristics than in the case where sulfolane is used singly.

Means for Solving the Problem

The present invention intends to provide a secondary battery having a terminal for surface mounting, which has a high capacity and a high resistance to leakage, and is excellent in charge/discharge cycle characteristics.

The present invention relates to a secondary battery having a terminal for surface mounting comprising a power generating element and a battery case for housing the power generating element, in which the power generating element comprises a positive electrode, a negative electrode, a separator interposed between the positive electrode and the negative electrode, and an organic electrolyte; the battery case comprises a positive electrode can electrically connected with the positive electrode, a negative electrode can electrically connected with the negative electrode, and a gasket interposed between the positive electrode can and the negative electrode can; the organic electrolyte comprises an organic solvent and a solute dissolved therein; the organic solvent comprises sulfolane and 1,2-dimethoxyethane; amounts of the sulfolane and the 1,2-dimethoxyethane are 80 to 95 volume % and 5 to 20 volume %, respectively, with respect to the total amount of the sulfolane and the 1,2-dimethoxyethane; the solute comprises $LiN(CF_3SO_2)_2$; and a concentration of the $LiN(CF_3SO_2)_2$ in the organic electrolyte is 0.9 to 1.3 mol/L.

The present invention includes an embodiment in which a positive electrode terminal and a negative electrode terminal are connected to the outside of the above-mentioned positive electrode can and the negative electrode can, respectively.

Herein, it is preferable that amounts of the sulfolane and the 1,2-dimethoxyethane are 85 to 95 volume % and 5 to 15 volume %, respectively, with respect to the total amount of the sulfolane and the 1,2-dimethoxyethane.

It is preferable that the negative electrode comprises a lithium aluminum alloy (a lithium alloy comprising aluminum).

EFFECT OF THE INVENTION

According to the present invention, it is possible to provide a secondary battery having a terminal for surface mounting, which has a high capacity, and is excellent in resistance to leakage and also excellent in charge/discharge cycle characteristics. Moreover, the secondary battery having a terminal for surface mounting according to the present invention can be mounted by means of a reflow method using lead-free solder. In view of these, the industrial value thereof is extremely high.

BRIEF DESCRIPTION OF THE DRAWINGS

[FIG. 1] A vertical sectional view of a secondary battery having a terminal for surface mounting according to Example of the present invention.

BEST MODE FOR CARRYING OUT THE INVENTION

A secondary battery having a terminal for surface mounting according to the present invention comprises a power generating element and a battery case for housing the power generating element, in which the power generating element comprises a positive electrode, a negative electrode, a separator interposed between the positive electrode and the negative electrode, and an organic electrolyte; and the battery case comprises a positive electrode can electrically connected with the positive electrode, a negative electrode can electrically connected with the negative electrode, and a gasket interposed between the positive electrode can and the negative electrode can. It is preferable that a shape of the battery is, for example, a coin shape, although it is not necessarily limited thereto.

A positive electrode can and a negative electrode can of a typical secondary battery for surface mounting have a positive electrode terminal and a negative electrode terminal connected to the outside thereof, respectively, for connecting the battery and a circuit board for mounting the same. Herein, there is a case where either one of the positive electrode can and the negative electrode can only has a terminal connected thereto. The present invention includes a case where the positive electrode can only has a terminal connected thereto, a case where the negative electrode can only has a terminal connected thereto, and a case where the positive electrode can and the negative electrode can have terminals connected thereto, respectively.

The organic electrolyte comprises an organic solvent and a solute dissolved therein; the organic solvent comprises sulfolane and 1,2-dimethoxyethane; and the solute comprises $LiN(CF_3SO_2)_2$. In the organic solvent, amounts of the sulfolane and the 1,2-dimethoxyethane are 80 to 95 volume % and 5 to 20 volume %, respectively, with respect to the total amount of the sulfolane and the 1,2-dimethoxyethane. Further, a concentration of the $LiN(CF_3SO_2)_2$ in the organic electrolyte is 0.9 to 1.3 mol/L.

According to the above-mentioned composition, it is possible to secure resistance to leakage and charge/discharge cycle characteristics in good balance in the battery having a terminal for surface mounting. It is preferable that a viscosity of the organic electrolyte is in the range from 10 to 30 mPa·s at 25° C. With the viscosity within this range, an amount of the organic electrolyte retained in the porous positive electrode is approximately equal to that of an organic electrolyte using sulfolane singly. Accordingly, particularly favorable charge/discharge cycle characteristics can be obtained.

The organic solvent may contain a solvent different from sulfolane and 1,2-dimethoxyethane if the amount thereof is small. However, it is preferable that the total amount of the sulfolane and the 1,2-dimethoxyethane is not less than 90 volume % with respect to the whole amount of the organic solvent.

When an amount of the sulfolane with respect to the total amount of the sulfolane and the 1,2-dimethoxyethane is less than 80 volume % and an amount of the 1,2-dimethoxyethane is more than 20 volume %, the cycle characteristics of the battery are degraded. Furthermore, when an amount of the sulfolane with respect to the total amount of the sulfolane and the 1,2-dimethoxyethane is more than 95 volume % and an amount of the 1,2-dimethoxyethane is less than 5 volume %, the cycle characteristics of the battery are also degraded. It should be noted that it is particularly preferable that in view of improving the charge/discharge cycle characteristics, amounts of the sulfolane and the 1,2-dimethoxyethane are 85 to 95 volume % and 5 to 15 volume %, respectively, with respect to the total amount of the sulfolane and the 1,2-dimethoxyethane.

The viscosity of sulfolane is 9.87 mPa·s at 30° C. The viscosity of 1,2-dimethoxyethane is 0.224 mPa·s at 25° C. There is thus a great difference between the two. For this reason, the viscosity of the organic solvent is abruptly decreased by adding a small amount of 1,2-dimethoxyethane. Hence, the type and the concentration of the solute have great importance.

$LiN(CF_3SO_2)_2$ has a higher molecular weight compared with $LiPF_6$ and $LiBF_4$ having low molecular weights, which are used for a typical lithium secondary battery. The $LiN(CF_3SO_2)_2$ can therefore improve the viscosity of the organic electrolyte. When $LiN(C_2F_5SO_2)_2$ or $LiN(CF_3SO_2)(C_4F_9SO)$ having a higher molecular weight is used, the viscosity of the organic electrolyte becomes extremely high, causing a decrease in the electrical conductivity.

The solute may contain a salt other than $LiN(CF_3SO_2)_2$, as long as the amount thereof is small. However, it is preferable that an amount of the $LiN(CF_3SO_2)_2$ is not less than 95 mol % with respect to the whole amount of the solute.

When a concentration of the $LiN(CF_3SO_2)_2$ contained in the organic electrolyte is less than 0.9 mol/L, the viscosity of the electrolyte is decreased; and when more than 1.3 mol/L, the viscosity of the electrolyte is increased. Herein, it is preferable that the concentration of the $LiN(CF_3SO_2)_2$ contained in the organic electrolyte is in the range from 0.95 to 1.25 mol/L in view of improving the charge/discharge cycle characteristics.

For the negative electrode, a mixture containing an active material, or a metal of a sheet shape or an alloy is used. The negative electrode mixture is molded in an electrode shape (for example, a pellet shape) to give the negative electrode. The metal of a sheet shape or the alloy is punched out in an electrode shape (for example, a pellet shape) to give the negative electrode. It is to be noted that since the mixture is porous, the organic electrolyte is easily absorbed therein. Therefore, it is more preferable to use the metal of a sheet shape or the alloy that does not absorb a large amount of the organic electrolyte. Usable as the metal are, for example, silicon, tin, germanium and the like. Usable as the alloy are a lithium aluminum alloy, a lithium silicon alloy, a lithium tin alloy and the like. Among these, the lithium aluminum alloy is preferable in view of excellence in resistance to overcharge and overdischarge when used, for example, for the purpose of back up. In the lithium aluminum alloy, a molar ratio of lithium to aluminum (Li/Al atom ratio) is preferably not more than one. Further, the lithium aluminum alloy contains an additional element by 0.1 to 10 weight % with respect to aluminum. It is preferable that the additional element is at least one selected from the group consisting of Mn, Mg and Si.

In the case where the mixture is used for the negative electrode, as the active material, a carbon material, a metal powder, an alloy powder or the like is used. As the carbon material, graphite, non-graphitizable carbon or the like is used. As the metal and the alloy, materials similar to those as mentioned above are used. Further, a compound that reacts at a potential of less than 1 V with respect to a lithium metal such as silicon monoxide, tin monoxide and cobalt monoxide is used. Furthermore, a compound that reacts at a potential of not less than 1 V with respect to a lithium metal such as spinal-type lithium titanium oxide and tangsten dioxide is used.

On the other hand, since there exists no lithium alloy that functions as the positive electrode, a mixture containing an active material is used as the positive electrode. The positive electrode mixture is molded in an electrode shape (for example, a pellet shape) to give the positive electrode. Usable as the positive electrode active material are a compound having a potential of approximately 3 V with respect to a lithium metal such as vanadium pentoxide, titanium disulfide, niobium pentoxide, molybdenum trioxide, a lithium manganese composite oxide, and tungsten trioxide; and a compound having a potential of approximately 4 V with respect to a lithium metal such as a lithium cobalt composite oxide (for example, lithium cobalt oxide), a lithium nickel composite oxide (for example, lithium nickel oxide) and a lithium manganese composite oxide (for example, spinal-type lithium manganese oxide).

The positive electrode mixture and the negative electrode mixture may further contain various desired components (for example, a binder and a conductive material) in addition to the active material. Usable as the binder are, for example, fluorocarbon resin, styrene butadiene rubber (SBR), ethylene-propylene-diene rubber (EPDM) and the like. Usable as the conductive material are, for example, carbon black, acetylene black, graphite and the like.

The material usable as the separator is, for example, cellulose, glass fibers and the like. Furthermore, an engineering plastic such as polyphenylene sulfide (PPS) may be used.

The gasket has a function of providing insulation between the positive electrode can and the negative electrode can as well as hermetically sealing the power generating element in the battery case. It is preferable that an engineering plastic such as polyphenylene sulfide (PPS), polyether ether ketone (PEEK) and tetrafluoroethylene-perfluoroalkoxyethylene copolymer (PFA) is used as the material of the gasket. The gasket may further contain a filler in order to improve the strength of the gasket. Usable as the filler are glass fibers, calcium titanate fibers and the like.

The materials usable as the positive electrode can and the negative electrode can are, for example, stainless steel, SUS444 and SUS304, which are excellent in resistance to corrosion.

The present invention is hereinafter described specifically based on Examples.

EXAMPLE 1

A secondary battery 10 having a terminal for surface mounting of a coin shape as illustrated in FIG. 1 was fabricated. A thickness of the secondary battery 10 was 1.4 mm and a diameter was 4.8 mm.

(i) Fabrication of a Positive Electrode

A mixture of lithium hydroxide and manganese dioxide was baked at 375° C. for 20 hours to obtain a lithium manganese composite oxide (lithiated Ramsdellite type manganese oxide: $Li_{0.5}MnO_2$). The obtained active material, carbon black as a conductive material, polytetrafluoroethylene (PTFE) powder as a binder were mixed at a weight ratio of 85:7:8 to obtain a positive electrode mixture. 7 mg of the obtained positive electrode mixture was molded into a pellet shape having a diameter of 2 mm and a thickness of 0.9 mm to obtain a positive electrode 4. Subsequently, the positive electrode 4 was dried in an atmosphere at 250° C. for 12 hours. The positive electrode 4 after drying was placed on a carbon paste (not shown) that was coated on the inner face of a positive electrode can 1 formed of stainless steel. The carbon paste functions as a current collector.

(ii) Fabrication of a Negative Electrode

Aluminum of a sheet shape was punched out in a disc shape having a diameter of 2.5 mm and a thickness of 0.2 mm. In addition, lithium of a sheet shape was punched out in a disc shape having a diameter of 2.4 mm and a thickness of 0.14 mm. The aluminum of a disc shape was press-fitted to the inner face of a negative electrode can 2 formed of stainless steel. The lithium of a disc shape was then press-fitted onto the aluminum of a disc shape to form a negative electrode 5.

(iii) Preparation of an Organic Electrolyte

In an organic solvent, which was prepared by mixing sulfolane and 1,2-dimethoxyethane at a volume ratio of sulfolane:1,2-dimethoxyethane=95:5, $LiN(CF_3SO_2)_2$ as a solute was dissolved at a concentration of 1.3 mol/L to obtain an organic electrolyte.

(iv) Assembly of a Battery

A toluene solution of butyl rubber was applied to the circumference portions of the positive electrode can 1 and a gasket 3 to allow toluene to vaporize, whereby a sealant (not shown) formed of a butyl rubber membrane was obtained. Next, the gasket 3 formed of polyether ether ketone (PEEK) was disposed on the circumference portion of the negative electrode can 2. A separator 6 formed of polyphenylene sulfide (PPS) was placed on the positive electrode 4, and then 2.0 μL of the organic electrolyte was injected into the positive electrode can 1. Lastly, the circumference portion of the positive electrode can 1 was caulked toward the circumference portion of the negative electrode can 2 with the gasket 3 interposed therebetween to hermetically close the battery case 1 comprising the positive electrode can 1, the negative electrode can 2 and the gasket 3. In the battery, lithium and aluminum constituting the negative electrode 5 were in a short-circuited state via the organic electrolyte. Accordingly, the lithium was electrochemically absorbed in the aluminum, whereby a lithium aluminum alloy was formed. A positive electrode terminal 7 and a negative electrode terminal 8, which were to be used for connecting a battery and a circuit board, were connected to the outside face of the positive electrode can 1 and the negative electrode can 2, respectively. The obtained battery was referred to as Battery A of Example 1.

EXAMPLES 2 TO 7

Batteries B to G of Examples 2 to 7 were fabricated in the same manner as in Battery A of Example 1 except that the mixing volume ratio of the sulfolane (SLF) to the 1,2-dimethoxyethane (DME), and the concentration of the $LiN(CF_3SO_2)_2$ contained in the organic electrolyte were changed as shown in Table 1.

TABLE 1

| Battery of Example | SLF (Volume %) | DME (Volume %) | $LiN(CF_3SO_2)_2$ (mol/L) |
|---|---|---|---|
| A | 95 | 5 | 1.3 |
| B | 95 | 5 | 0.9 |
| C | 90 | 10 | 1.3 |
| D | 85 | 15 | 1.3 |
| E | 80 | 20 | 1.3 |
| F | 80 | 20 | 1.1 |
| G | 80 | 20 | 0.9 |
| 1 | 100 | 0 | 1.3 |
| 2 | 95 | 5 | 1.5 |
| 3 | 95 | 5 | 0.8 |
| 4 | 80 | 20 | 1.5 |
| 5 | 80 | 20 | 0.8 |
| 6 | 70 | 30 | 1.3 |
| 7 | 30 | 70 | 1.3 |
| 8 | 30 | 70 | 0.75 |
| 9 | 30 | 70 | 0.75 |

COMPARATIVE EXAMPLE 1

Battery 1 of Comparative Example 1 was fabricated in the same manner as in Battery A of Example 1 except that the organic solvent of the organic electrolyte was changed to a solvent comprising sulfolane singly.

COMPARATIVE EXAMPLE 2

Battery 2 of Comparative Example 2 was fabricated in the same manner as in Battery A of Example 1 except that the concentration of the $LiN(CF_3SO_2)_2$ contained in the organic electrolyte was changed to 1.5 mol/L.

COMPARATIVE EXAMPLE 3

Battery 3 of Comparative Example 3 was fabricated in the same manner as in Battery A of Example 1 except that the concentration of the $LiN(CF_3SO_2)_2$ contained in the organic electrolyte was changed to 0.8 mol/L.

COMPARATIVE EXAMPLE 4

Battery 4 of Comparative Example 4 was fabricated in the same manner as in Battery E of Example 1 except that the concentration of the $LiN(CF_3SO_2)_2$ contained in the organic electrolyte was changed to 1.5 mol/L.

COMPARATIVE EXAMPLE 5

Battery 5 of Comparative Example 5 was fabricated in the same manner as in Battery -E of Example 1 except that the concentration of the $LiN(CF_3SO_2)_2$ contained in the organic electrolyte was changed to 0.8 mol/L.

COMPARATIVE EXAMPLE 6

Battery 6 of Comparative Example 6 was fabricated in the same manner as in Battery A of Example 1 except that the volume ratio of the sulfolane to the 1,2-dimethoxyethane in the organic solvent was changed to that of sulfolane:1,2-dimethoxyethane=70:30.

COMPARATIVE EXAMPLE 7

Battery 7 of Comparative Example 7 was fabricated in the same manner as in Battery A of Example 1 except that the volume ratio of the sulfolane to the 1,2-dimethoxyethane in the organic solvent was changed to that of sulfolane:1,2-dimethoxyethane=30:70.

COMPARATIVE EXAMPLE 8

Battery 8 of Comparative Example 8 was fabricated in the same manner as in Battery A of Example 1 except that the volume ratio of the sulfolane to the 1,2-dimethoxyethane in the organic solvent was changed to that of sulfolane:1,2-dimethoxyethane=30:70, and in addition, the concentration of the $LiN(CF_3SO_2)_2$ contained in the organic electrolyte was changed to 0.75 mol/L.

COMPARATIVE EXAMPLE 9

Battery 9 of Comparative Example 9 was fabricated in the same manner as in Battery A of Example 1 except that the volume ratio of the sulfolane to the 1,2-dimethoxyethane in the organic solvent was changed to that of sulfolane:1,2-dimethoxyethane=30:70, the concentration of the $LiN(CF_3SO_2)_2$ contained in the organic electrolyte was changed to 0.75 mol/L, and in addition, the amount of the organic electrolyte to be injected into the battery was changed to 3 μL (1.5 times of that of Battery A).

[Evaluation]

(Incidence of Leakage)

In each Examples and Comparative Examples, 100 batteries were prepared and then the batteries were subjected to a preparatory discharge for one hour at a constant current of 50 μA. The batteries were subsequently passed through a hot air system reflow oven so that heat shock was applied to each battery. The incidence of leakage was thus determined.

The temperature profile of the reflow process was as follows.

(1) Preheating process: Exposing the batteries for two minutes in an environment of 180° C.;

(2) Heating process: Passing the batteries through an oven, the maximum temperature of which was 250° C. and the minimum temperature in the inlet or the outlet of which was 180° C., in a duration of 30 seconds; and (3) Cooling process: Cooling the batteries naturally until reaching a room temperature.

After passed through the above-mentioned reflow oven twice, the batteries were checked for leakage incidence (number of leakage/100). The results are shown in Table 2.

(Internal Resistance)

With respect to the batteries before introduced into the above-mentioned reflow oven, the internal resistances (Ω) at 1 kHz AC were measured to determine a mean value of the 100 batteries. Further, with respect to good batteries in which leakage did not occur after passed through the reflow oven twice, the internal resistances (Ω) at 1 kHz AC were measured to determine a mean value of all the good batteries. The results are shown in Table 2.

(Initial Discharge Capacity)

The good batteries in which leakage did not occur after passed through the reflow oven twice were subjected to charge and discharge (charge end voltage 3.0 V/discharge end voltage 2.0 V) at a constant current of 5 μA, and the initial discharge capacities were checked to determine a mean value of all the good batteries. The results are shown in Table 2.

(Cycle Characteristics)

After the initial discharge capacity was determined, the batteries were subjected to repeated charge and discharge under the similar conditions, and the numbers of cycles repeated until the each discharge capacity became half of the capacity to be obtained in view of the battery design were checked to determine a mean value of all the good batteries. The results are shown in Table 2.

TABLE 2

| Battery | Internal resistance (Ω) Before reflow | Internal resistance (Ω) After reflow | Incidence of leakage | Initial discharge capacity (mAh) | Cycle characteristics (number of cycles) |
|---|---|---|---|---|---|
| A | 455 | 1021 | 0/100 | 0.81 | 21 |
| B | 422 | 967 | 0/100 | 0.81 | 23 |
| C | 393 | 945 | 0/100 | 0.82 | 24 |
| D | 402 | 918 | 0/100 | 0.82 | 22 |
| E | 381 | 876 | 0/100 | 0.82 | 19 |
| F | 367 | 840 | 0/100 | 0.82 | 19 |
| G | 350 | 823 | 0/100 | 0.82 | 18 |
| 1 | 580 | 1950 | 0/100 | 0.80 | 10 |
| 2 | 530 | 1650 | 0/100 | 0.81 | 12 |
| 3 | 505 | 1730 | 0/100 | 0.81 | 11 |
| 4 | 470 | 1420 | 0/100 | 0.81 | 13 |
| 5 | 600 | 2230 | 0/100 | 0.72 | 9 |
| 6 | 680 | 3500 | 0/100 | 0.65 | 7 |
| 7 | 900 | 4800 | 0/100 | 0.43 | 5 |
| 8 | 1100 | 6700 | 0/100 | 0.28 | 4 |
| 9 | 220 | 640 | 10/100 | 0.82 | 28 |

In Batteries A to G of Examples and Batteries 1 to 8 of Comparative Examples, no leakage occurred after the passage through the reflow oven. In contrast, in Battery 9, approximately 10 percent of the batteries caused leakage. This was because the organic electrolyte was injected in the battery at an amount corresponding to approximately 50% of the internal volume of the battery (6 μL). However, favorable cycle characteristics were demonstrated in Battery 9. It was considered that in order to prevent leakage; it was important to have the organic electrolyte injected at an amount corresponding to 30 to 40% of the internal volume of the battery.

In the batteries of Examples, the discharge capacities were stable at approximately 0.8 mAh. Further, with respect to the cycle characteristics, in the batteries of Examples, the numbers of charge/discharge cycles until the capacities reduced to half of the initial capacities were favorable such that they were approximately 20 cycles. In contrast, in Batteries 6 to 8 of Comparative Examples, the initial discharge capacities were low. Further, in Batteries 2 to 8 of Comparative Examples, the cycle characteristics were equivalent or lower to that of Battery 1, which uses the organic solvent comprising sulfolane singly. Furthermore, the batteries of Comparative Examples had a tendency to show that the internal resistances were higher than those of the batteries of Examples even before the batteries were passed through the reflow oven. The internal resistances of the batteries of Comparative Examples were extremely high after the passage through the reflow oven.

The results of Table 2 demonstrated that a secondary battery having a terminal for surface mounting, which had a high capacity and was excellent in resistance to leakage and also excellent in charge/discharge characteristics was obtained by using an organic electrolyte in which $LiN(CF_3SO_2)_2$ was dissolved in an organic solvent that comprises 80 to 95 volume % of sulfolane and 5 to 20 volume % of 1,2-dimethoxyethane, at a concentration of 0.9 to 1.3 mol/L.

EXAMPLE 8

Battery H of Example 8 was fabricated in the same manner as in Battery A of Example 1 except that the positive electrode active material was changed to spinal-type lithium manganese oxide ($LiMn_2O_4$).

EXAMPLE 9

A lithium aluminum alloy powder (mean particle size 10 μm) containing 79.5 weight % of aluminum and polyvinylidene fluoride (PVDF) as a binder were mixed at a weight ratio of 95:5 to obtain a negative electrode mixture. The negative electrode mixture of an amount corresponding to an electrical capacity equal to that of the negative electrode of Battery A was molded into a pellet shape having a diameter of 2.3 mm, whereby a negative electrode was obtained. Battery I of Example 9 was fabricated in the same manner as in Battery A of Example 1 except that the obtained negative electrode was used.

The batteries of Examples 8 and 9 were evaluated in the same manner as in Example 1. The results are shown in Table 3.

TABLE 3

| Battery | Internal resistance (Ω) Before reflow | After reflow | Incidence of leakage | Initial discharge capacity (mAh) | Cycle characteristics (number of cycles) |
|---|---|---|---|---|---|
| A | 455 | 1021 | 0/100 | 0.81 | 21 |
| H | 432 | 900 | 0/100 | 0.81 | 22 |
| I | 480 | 1500 | 0/100 | 0.82 | 15 |

Table 3 demonstrated that even when the type of the positive electrode active material was changed, a secondary battery having a terminal for surface mounting that had similarly favorable characteristics was obtained. Herein, in Battery H, the discharge capacity was favorable, but the internal resistance values before and after allowing the batteries to pass through the reflow oven were relatively high. Further, the cycle characteristics of Battery I were lower than those of the other Examples. It was considered that the organic electrolyte was captured in the voids of the negative electrode comprising a porous mixture, causing a decrease in a liquid retaining amount of the organic electrolyte in the separator. Accordingly, in view of the charge/discharge cycle characteristics, it is preferable to use the metal of a sheet shape or the alloy for the negative electrode.

INDUSTRIAL APPLICABILITY

The present invention is applicable to a secondary battery having a terminal for surface mounting in general where resistance to high temperatures and resistance to leakage are required. The secondary battery having a terminal for surface mounting of the present invention can be mounted by means of a reflow method at a considerably high temperature. The secondary battery having a terminal for surface mounting of the present invention is therefore effective especially in the field to which the reflow method using lead-free solder is applied.

The invention claimed is:

1. A secondary battery having a terminal for surface mounting comprising a power generating element and a battery case for housing said power generating element, wherein:

said power generating element comprises a positive electrode, a negative electrode, a separator interposed between said positive electrode and said negative electrode, and an organic electrolyte;

said battery case comprises a positive electrode can electrically connected with said positive electrode, a negative electrode can electrically connected with said negative electrode, and a gasket interposed between said positive electrode can and said negative electrode can;

said organic electrolyte comprises an organic solvent and a solute dissolved therein;

said organic solvent comprises sulfolane and 1,2-dimethoxyethane;

amounts of said sulfolane and said 1,2-dimethoxyethane are 80 to 95 volume % and 5 to 20 volume %, respectively, with respect to the total amount of said sulfolane and said 1,2-dimethoxyethane;

said solute comprises $LiN(CF_3SO_2)_2$; and a concentration of said $LiN(CF_3SO_2)_2$ in said organic electrolyte is 0.9 to 1.3 mol/L.

2. A secondary battery having a terminal for surface mounting in accordance with claim 1, wherein amounts of said sulfolane and said 1,2-dimethoxyethane are 85 to 95 volume % and 5 to 15 volume %, respectively, with respect to the total amount of said sulfolane and said 1,2-dimethoxyethane.

3. A secondary battery having a terminal for surface mounting in accordance with claim 1, wherein said negative electrode comprises a lithium aluminum alloy.

4. A secondary battery having a terminal for surface mounting in accordance with claim 3, wherein said lithium aluminum alloy is of a sheet shape.

* * * * *